United States Patent Office 3,396,588
Patented Aug. 13, 1968

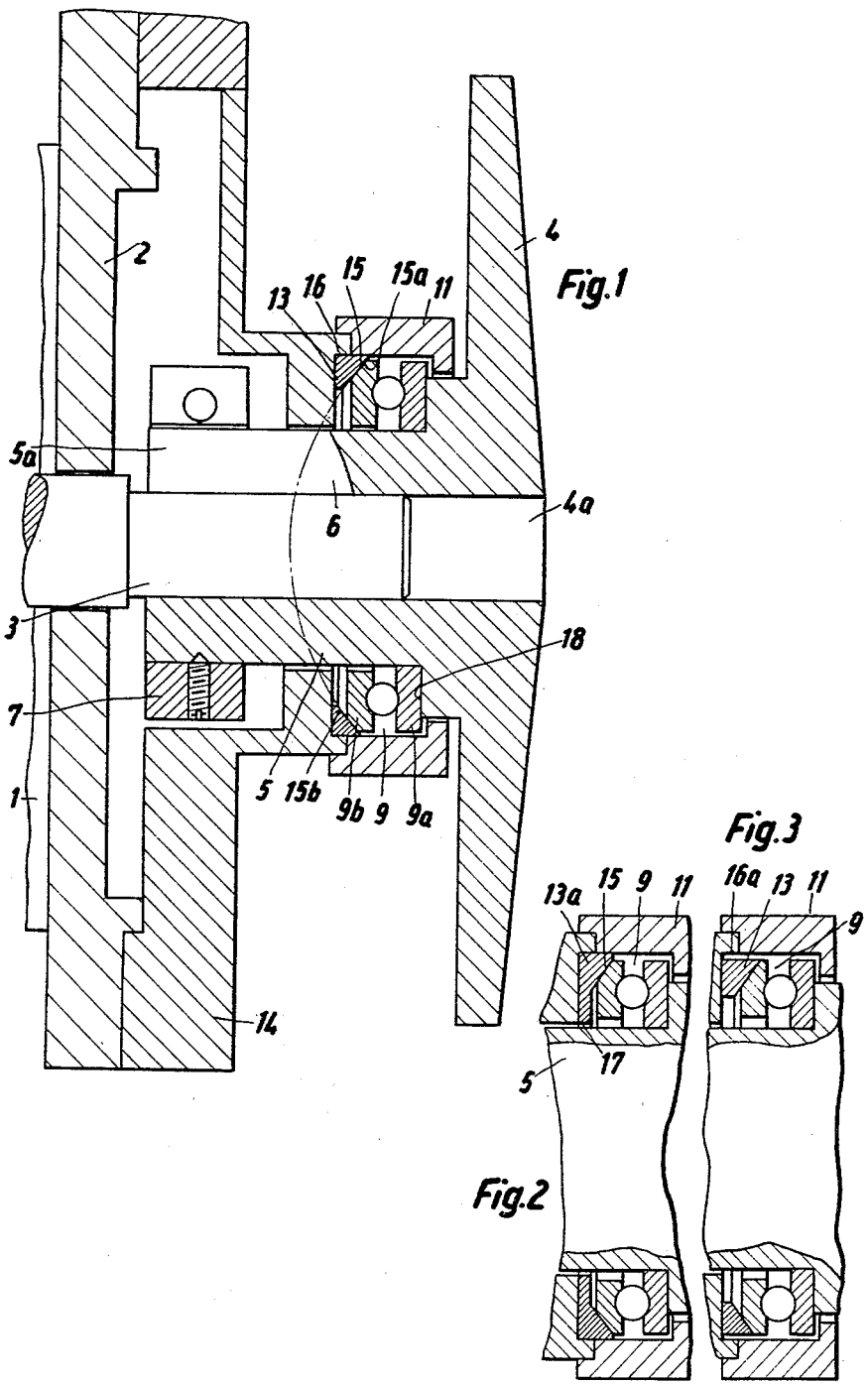

3,396,588
INFINITELY VARIABLE FRICTION CONE TRANSMISSION
Paul Stober and Wilhelm Stober, Pforzheim, Germany, assignors to Gebruder Stober Maschinenfabrik, Pforzheim, Germany
Filed May 4, 1966, Ser. No. 547,465
Claims priority, application Germany, May 18, 1965, St 23,840
5 Claims. (Cl. 74—190)

ABSTRACT OF THE DISCLOSURE

An infinitely variable friction cone transmission in which the friction cone is journalled on a motor shaft and in which a thrust bearing is located between a motor housing flange and the friction cone in the immediate vicinity of the latter, while that race ring of said thrust bearing which is closest to the motor has an end face near the peripheral portion thereof provided with a spherical surface engaging a correspondingly shaped spherical surface at said housing.

---

The present invention relates to an infinitely variable friction cone transmission with a displaceably mounted motor and with a friction cone which is mounted on said motor shaft and which by means of an anti-friction bearing is resting against a displaceable housing flange to which the motor has been flanged, and in which the friction cone is provided with a hub having at least one slit extending over a portion of said hub in axial direction thereof while said hub is pressed by a clamping ring to the motor shaft. The present invention more specifically refers to a friction cone transmission of the just mentioned type, in which one race ring of the anti-friction bearing which is mounted between the friction cone hub and a bearing housing is arranged with play in a corresponding recess in said bearing housing and is angularly movable with regard to the housing flange.

With friction cone transmissions of this type, a radial bearing serves as bearing between the slit-free portion of the friction cone hub and the bearing housing. Such radial bearings, however, can absorb primarily forces only which act in a radial direction with regard to the axis of rotation but are either not at all able or only to a very minor extent to absorb forces which act in the direction of the axis of rotation. With a friction cone transmission of the above mentioned type, however, considerable axial forces occur.

It is, therefore, an object of the present invention to provide an infinitely variable friction cone transmission, which will overcome the above mentioned drawbacks.

It is another object of this invention to provide a friction cone transmission of the above mentioned type, in which in particular the axial forces will be uniformly transmitted to the bearing without subjecting the shaft of the driving motor unduly or unilaterally to stresses.

These and other objects and advantages of the invention will appear more clearly from the following specification in connection with the accompanying drawing, in which:

FIG. 1 is an axial section through a friction cone transmission according to the present invention.

FIGS. 2 and 3 respectively illustrate some modifications over the arrangement of FIG. 1.

As mentioned above, the present invention concerns an infinitely variable friction cone transmission with a displaceably mounted motor and with a motor shaft on which is mounted a friction cone which latter by means of an anti-friction bearing rests against a displaceable housing flange to which the motor has been flanged while the said hub is provided with at least one axial slit extending over a portion of the hub and the slit portion of the hub is clamped to the motor shaft for power transmission. On said slit-free portion of the hub there is mounted an anti-friction bearing one race ring of which is arranged in a corresponding enlarged recess of the bearing housing and is angularly movable relative to the housing flange. The friction cone transmission of this type is according to the present invention characterized in that the anti-friction bearing is formed by an axial or thrust bearing with two race rings spaced from each other in axial direction of the hub while one of said rings has an at least partially spherical outer surface for cooperation with a corresponding spherical surface on the housing flange. In this way, the high axial pressures acting upon the friction cone can be absorbed while the balls of the thrust bearing will with increasing force acting upon the friction cone be pressed to a greater extent into the running grooves of the bearing rings and thus will be centered so that a radial deviation or movement, especially of the race ring provided with the spherical surface will be avoided. In view of the spherical engagement of the race ring resting on the housing flange, the force acting eccentrically and parallelly to the axis of rotation upon the friction cone will approximately uniformly be distributed upon all balls so that a destruction of the bearing will be avoided.

According to a further feature of the invention, the concave spherical surface of the housing flange is provided on a ring which is connected to the housing flange and is approximately coaxial with the hub of the friction cone. In this connection, it is particularly advantageous to design the inner diameter of this ring only slightly greater than the diameter of the friction cone hub inasmuch as in this instance an additional labyrinth-like seal of the bearing will be obtained.

According to a further development of the present invention, the ring of the housing flange is arranged in a correspondingly turned-out recess of the housing flange. In this way, a simple way of manufacturing and assemblying the bearing support will be possible.

According to a still further embodiment of the present invention, the turned-out recess has a greater diameter than the ring so that the latter can deviate in radial direction to a predetermined small extent.

Referring now to the drawing in detail, the arrangement shown in FIG. 1 illustrates a motor shaft 3 of a motor generally designated by the reference numeral 1 which is closed by a flange 2 and has its shaft 3 inserted in a bore 4a of a hub 5 pertaining to a friction cone 4. Hub 5 is provided with at least one, preferably a plurality of axial slits 6 extending over a portion of the length of hub 5. The slit end 5a of the cone hub 5 is by means of a clamping ring 7 firmly clamped onto motor shaft 3. The slit-free portion of hub 5 has mounted thereon a ball bearing 9 forming an axial or thrust bearing. Race ring 9a of said bearing 9 which is adjacent the friction cone 4 rests by means of its shoulder 18 against said friction cone 4. Race ring 9b which stands still and faces housing flange 14 coaxially arranged on flange 2 of motor 1 rests through the intervention of a spherical surface 15 on housing flange 14.

The spherical surface of ball bearing 9b on housing flange 14 is formed by a convex spherical surface 15a the center of curvature of which is located on the axis of ring 9b. By means of said convex spherical surface 15a, race ring 9b rests on a corresponding concave spherical surface 15b provided on a ring 13 resting against housing flange 14. Ring 13 is provided in a correspondingly turned out recess 16 of housing flange 14. Race ring 9b of the thrust bearing 9 is radially spaced from a cover or bearing housing 11 of housing flange 14 and from hub 5, said cover 11 surrounding the bearing 9.

The arrangement of the spherical engaging surface 15 of the thrust bearing 9 for cooperation with the housing flange 14 permits the desired self-adjustment of the bearing within certain limits. The force eccentrically acting upon the friction cone will in this way be at least approximately uniformly distributed over all of the balls of the thrust bearing 9 so that these balls will with increasing force be pressed more into the running grooves of the race ring 9a, 9b and will thus be centered so that they will also be able to absorb the radially acting forces.

According to the embodiment illustrated in FIG. 2, the ring 13a on housing flange 14, which ring is provided with a spherical surface 15b has an inner diameter which is only slightly greater than the outer diameter of the hub 5. As a result thereof, in view of the thus formed annular gap 17, an additional labyrinth-like seal is obtained for the bearing 9.

According to the embodiment illustrated in FIG. 3, the recess 16a in housing flange 14, which recess receives annular member 13, has a greater diameter than annular member 13. Consequently, ring 13 is able to move in radial direction to a predetermined extent so that ring 9b of the thrust bearing 9 will be able to adapt itself still further to the respective operative conditions.

It is, of course, to be understood that the present invention is, by no means, limited to the particular arrangements shown in the drawing but also comprises any modifications within the scope of the appended claims.

What we claim is:

1. In combination with a motor having a shaft rotatably connected thereto and also having flange means connected to said motor: a friction cone member having a hub section with an axial bore receiving said rotatable shaft, said hub section being provided with at least one axial slit extending over an axial portion of said hub section, clamping ring means surrounding said slit hub section and firmly clamping the same to said motor shaft for rotation therewith, anti-friction thrust bearing means interposed between said flange means and a slit-free portion of said hub section of said friction cone member and in the immediate vicinity of the latter for absorbing axial pressure exerted upon said friction cone member, said thrust bearing means including two race rings having the planes of their race surfaces extending transverse to the axis of rotation of said cone member, one of said race rings being adjacent to said flange means and having a convex spherical marginal portion on that surface thereof which faces said flange means, and means including concave spherical surface means on said flange means in sliding engagement with said convex spherical surface portion.

2. An arrangement according to claim 1, in which said concave spherical surface means forms a part of an annular member substantially coaxially arranged with regard to said friction cone hub and connected to said flange means.

3. An arrangement according to claim 2, in which the inner diameter of said ring member is only slightly greater than the outer diameter of the friction cone hub so as to form a sealing gap therewith.

4. An arrangement according to claim 2, in which said flange means is provided with an annular recess having said ring member arranged therein.

5. An arrangement according to claim 4, in which the outer diameter of said annular recess is greater than the outer diameter of said ring member.

References Cited
FOREIGN PATENTS

| 501,118 | 2/1939 | Great Britain. |
| 897,641 | 8/1954 | Germany. |
| 923,883 | 2/1947 | France. |

C. J. HUSAR, *Primary Examiner.*